US008606331B2

(12) United States Patent
Yue (10) Patent No.: US 8,606,331 B2
(45) Date of Patent: Dec. 10, 2013

(54) SOFT KEYBOARD DISPLAY METHOD AND MOBILE TERMINAL

(71) Applicant: Huawei Device Co., Ltd., Guangdong (CN)

(72) Inventor: Anzhao Yue, Bangalore (IN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 13/731,339

(22) Filed: Dec. 31, 2012

(65) Prior Publication Data

US 2013/0122962 A1   May 16, 2013

Related U.S. Application Data (63) Continuation of application No. PCT/CN2011/081016, filed on Oct. 20, 2011.

(51) Int. Cl.
*H04M 1/00* (2006.01)

(52) U.S. Cl.
USPC ........................ 455/566; 455/550.1

(58) Field of Classification Search
USPC ........ 455/418, 420, 550.1, 556.1–556.2, 557, 455/566, 575.3–575.4, 575.8, 457, 466; D14/315, 318, 320, 322, 326–327, 333, D14/338–339; 348/14.03, 14.07; 382/167, 382/178, 295, 302; 345/2.3, 4–8, 168–170, 345/173, 175–176, 619
See application file for complete search history.

(56) References Cited

U.S. PATENT DOCUMENTS

| | | | |
|---|---|---|---|
| 6,121,960 A * | 9/2000 | Carroll et al. | ................. 345/173 |
| 6,501,464 B1 | 12/2002 | Cobbley et al. | |
| 6,882,337 B2 * | 4/2005 | Shetter | ......................... 345/173 |
| 2003/0197687 A1 | 10/2003 | Shetter | |
| 2004/0104942 A1 | 6/2004 | Weigel | |

(Continued)

FOREIGN PATENT DOCUMENTS

| | | |
|---|---|---|
| CN | 1489724 A | 4/2004 |
| CN | 1620642 A | 5/2005 |

(Continued)

OTHER PUBLICATIONS

Foreign Communication From a Counterpart Application, Chinese Application 201180002535.7, Chinese Office Action dated Nov. 2, 2012, 6 pages.

(Continued)

*Primary Examiner* — Meless Zewdu
(74) *Attorney, Agent, or Firm* — Conley Rose, P.C.; Grant Rodolph; Rayhao Chung (57) ABSTRACT

The present invention provides a soft keyboard display method and a mobile terminal, and relates to the field of mobile terminals. The method includes: processing a picture of a soft keyboard by adopting an α blending technology according to a preset transparency parameter, so that the picture of the soft keyboard presents transparency corresponding to the transparency parameter; and displaying a processed picture of the soft keyboard on a current background picture of a mobile terminal touchscreen in a suspended manner when it is detected that the soft keyboard needs to be displayed. The mobile terminal includes: a transparency processing module and a suspended displaying module. The mobile terminal includes: a touchscreen and at least one processor. The processor is coupled with the touchscreen. The processor is configured to perform the function of the soft keyboard display method.

12 Claims, 5 Drawing Sheets

(56) References Cited

U.S. PATENT DOCUMENTS

| | | |
|---|---|---|
| 2005/0140660 A1 | 6/2005 | Valikangas |
| 2006/0274944 A1 | 12/2006 | Tanaka et al. |
| 2009/0187851 A1 | 7/2009 | Liu |
| 2010/0060585 A1* | 3/2010 | Chiu ............................ 345/168 |
| 2011/0148787 A1* | 6/2011 | Kim ............................. 345/173 |
| 2011/0154246 A1* | 6/2011 | Oh et al. ...................... 715/773 |
| 2011/0201387 A1* | 8/2011 | Paek et al. ................... 455/566 |

FOREIGN PATENT DOCUMENTS

| | | |
|---|---|---|
| CN | 1641538 A | 7/2005 |
| CN | 1307517 C | 3/2007 |
| CN | 101039477 A | 9/2007 |
| CN | 101287206 A | 10/2008 |
| CN | 101369215 A | 2/2009 |
| CN | 201260222 Y | 6/2009 |
| CN | 100512355 C | 7/2009 |
| CN | 101493749 A | 7/2009 |
| CN | 101582937 A | 11/2009 |
| CN | 101764867 A | 6/2010 |
| JP | 2003295996 A | 10/2003 |

OTHER PUBLICATIONS

Foreign Communications From a Counterpart Application, Chinese Application 201180002535.7, Partial English Translation of Chinese Office Action dated Nov. 2, 2012, 3 pages.

Foreign Communication From a Related Counterpart Application, European Application No. 11856390.7, Extended European Search Report dated Mar. 27, 2013, 6 pages.

Communication from a foreign counterpart application, International Application No. PCT/CN2011/081016, International Search Report dated Aug. 16, 2012, 3 pages.

Communication from a foreign counterpart application, International Application No. PCT/CN2011/081016, Partial English Translation, International Search Report dated Aug. 16, 2012, 2 pages.

* cited by examiner

SOFT KEYBOARD DISPLAY METHOD AND MOBILE TERMINAL

CROSS-REFERENCE TO RELATED APPLICATION

This application is a continuation of International Application No. PCT/CN2011/081016, filed on Oct. 20, 2011, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of mobile terminals, and in particular, to a soft keyboard display method and a mobile terminal.

BACKGROUND

With the development of smart phones, there are more and more touchscreen mobile phones. Most touchscreen mobile phones only provide a soft keyboard input manner, but do not provide a hard keyboard input manner.

Figure 1:
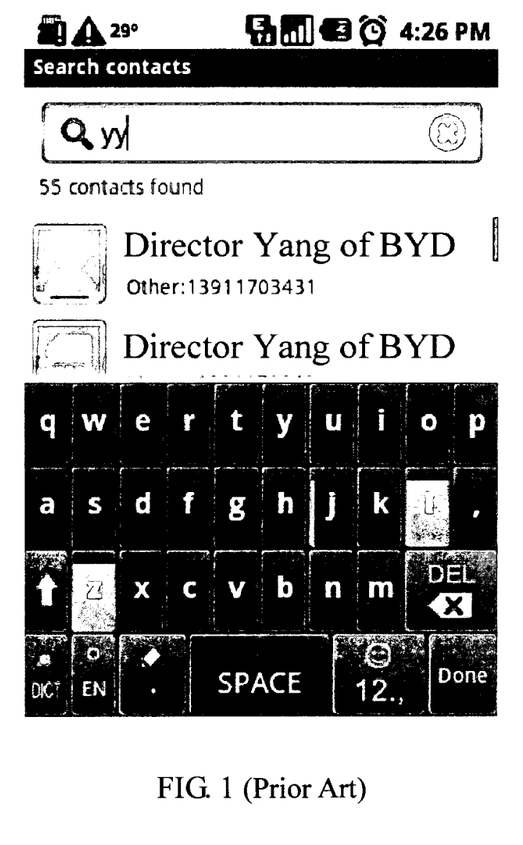
FIG. 1 is a schematic diagram of soft keyboard display in the prior art.
Figure 2:
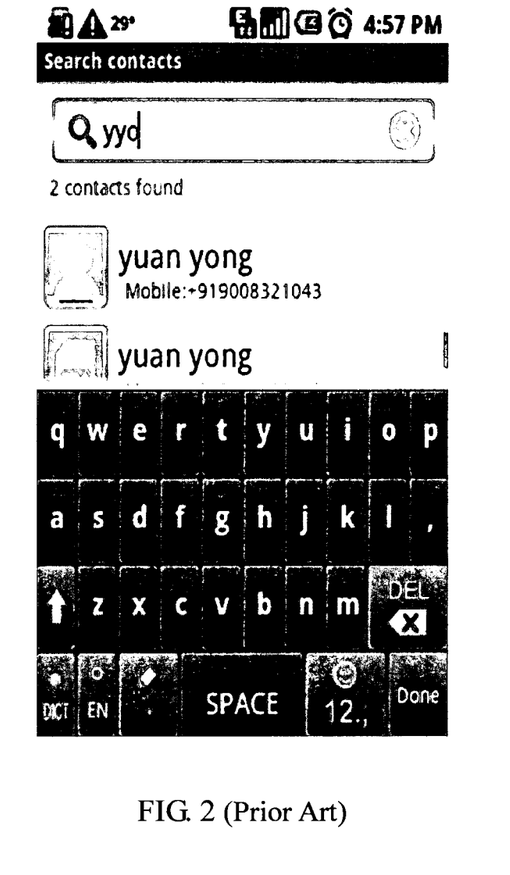
FIG. 2 is another schematic diagram of the soft keyboard display in the prior art.

At present, a soft keyboard is displayed in the following manner: a soft keyboard is invoked for input when a user edits a short message, searches a phone book, inputs text, and so on, and a picture of the soft keyboard occupies a large part of space of a mobile phone touchscreen. Referring to FIG. 1, when a user searches a phone book, the picture of the soft keyboard occupies half the space of the whole mobile phone touchscreen; and only half the space of the mobile phone touchscreen is left for displaying found contacts. If the user wants to view more contacts, the user has to slide a scroll bar. Due to limited display space, in order to find a more exact contact "yuan yong," referring to FIG. 2, the user needs to input more searching characters. Three characters need to be input to find "yuan yong."

The existing soft keyboard display manner occupies a large part of the space of the mobile phone touchscreen. As a result, a display area of the mobile phone touchscreen becomes smaller and input times are increased, which affects user experience.

SUMMARY

In order to increase a display area of a mobile terminal touchscreen and reduce input times, embodiments of the present invention provide a soft keyboard display method and a mobile terminal.

In one aspect, a soft keyboard display method is provided, where the method includes: processing a picture of a soft keyboard by adopting an Alpha Blending (α blending) technology according to a preset transparency parameter, so that the picture of the soft keyboard presents transparency corresponding to the transparency parameter; and displaying a processed picture of the soft keyboard on a current background picture of a mobile terminal touchscreen in a suspended manner when it is detected that the soft keyboard needs to be displayed.

In another aspect, a mobile terminal is provided, where the mobile terminal includes: a transparency processing module configured to process a picture of a soft keyboard by adopting an α blending technology according to a preset transparency parameter, so that the picture of the soft keyboard presents transparency corresponding to the transparency parameter; and a suspended displaying module configured to display a processed picture of the soft keyboard on a current background picture of a mobile terminal touchscreen in a suspended manner when it is detected that the soft keyboard needs to be displayed.

In another aspect, a mobile terminal is provided, where the mobile terminal includes: a touchscreen and at least one processor, where the processor is coupled with the touchscreen; the processor is configured to process a picture of a soft keyboard by adopting an α blending technology according to a preset transparency parameter, so that the picture of the soft keyboard presents transparency corresponding to the transparency parameter and display a processed picture of the soft keyboard on a current background picture of the touchscreen in a suspended manner when it is detected that the soft keyboard needs to be displayed.

The picture of the soft keyboard is processed by adopting the α blending technology, so that the picture of the soft keyboard is semitransparent. The semitransparent picture of the soft keyboard is displayed on the mobile terminal touchscreen in a suspended manner, so as to increase the display area of the mobile terminal touchscreen. Moreover, due to the increase of display area, displayed items are increased accordingly. A user is able to find an item, which the user wants to find, with fewer input times, so that user experience is improved.

BRIEF DESCRIPTION OF THE DRAWINGS

To illustrate the technical solutions in the embodiments of the present invention more clearly, the following briefly describes accompanying drawings required for describing the embodiments. Obviously, the accompanying drawings in the following description are merely some embodiments of the present invention, and persons of ordinary skill in the art may obtain other accompanying drawings from these accompanying drawings without making creative efforts.

DETAILED DESCRIPTION

To make the objectives, technical solutions, and advantages of the present invention more clear, the following describes the embodiments of the present invention in further detail below with reference to the accompanying drawings.

First, it should be noted that the mobile terminal described in the embodiments of the present invention includes, but is not limited to, electronic equipment with a touchscreen, such as phones of various modes, smart phones based on different operating systems, a personal digital assistant (PDA), a laptop computer, a tablet computer, and so on.

The various embodiments of the present invention are described with reference to the details discussed below, and the various embodiments are illustrated by the accompanying drawings. The following descriptions and drawings are illustrations of the present invention and shall not be explained as a limit to the present invention. Many specific details are described to provide comprehensive understanding for the various embodiments of the present invention. However, in some certain embodiments, well-known or conventional details are not described, so as to provide a concise discussion on the embodiments of the present invention.

Figure 3:
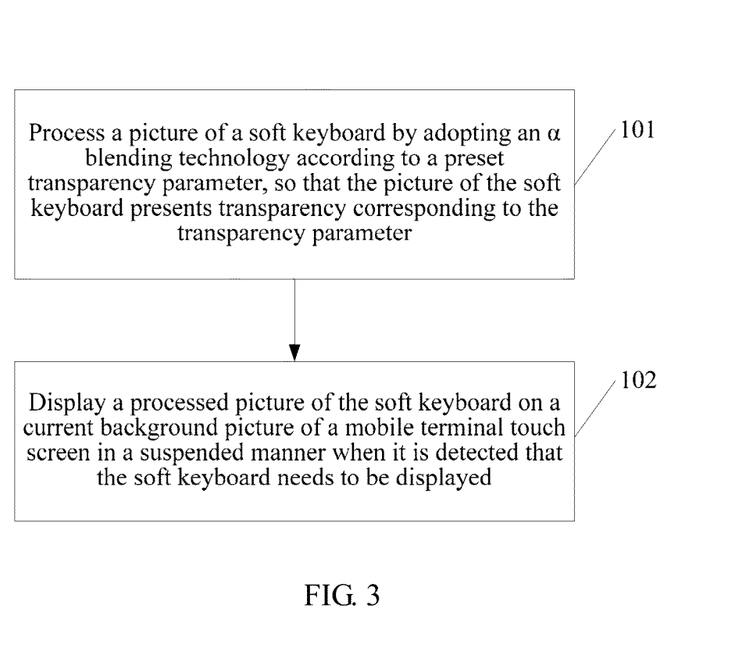
FIG. 3 is a flow chart of a soft keyboard display method according to an embodiment of the present invention.

Referring to FIG. 3, an embodiment of the present invention provides a soft keyboard display method, where the method includes:

101: Process a picture of a soft keyboard by adopting an $\alpha$ blending technology according to a preset transparency parameter, so that the picture of the soft keyboard presents transparency corresponding to the transparency parameter.

The $\alpha$ blending technology is used to achieve an image overlay display function, and its principle is as follows:

First, tri-color values (in this embodiment, the tri-color values may be red (R), green (G), and blue (B)) of each pixel of a source image (in this embodiment, the source image is the picture of the soft keyboard) and a target image (in this embodiment, the target image is a current background picture of a mobile terminal touchscreen) are separated.

Second, three color components of the pixel of the source image are each multiplied by a set transparency parameter (in this embodiment, the transparency parameter is set to $\alpha$, for example, 0.6).

Then, three color components of the pixel of the target image are each multiplied by a negated value of the transparency parameter (that is, $1-\alpha$, for example, $1-0.6=0.4$).

Finally, the processed color components of the pixel of the source image are each added to the corresponding processed color components of the pixel of the target image to obtain color components of a pixel of a composite image, so as to achieve an effect of displaying the source image on the target image in a suspended manner.

The transparency parameter ranges from 0 to 1, excluding 0 and 1. For example, the transparency parameter may be set to 0.6, 0.5, 0.3, and so on, a specific value of which is not limited in the embodiment.

102: Display a processed picture of the soft keyboard on the current background picture of the mobile terminal touchscreen in a suspended manner when it is detected that the soft keyboard needs to be displayed.

Further, in order to achieve a focus switch between a soft keyboard interface and an input interface, after the processed picture of the soft keyboard is displayed on the current background picture of the mobile terminal touchscreen in a suspended manner, the method further includes: hiding the picture of the soft keyboard when a click or a slide is detected in a non-soft-keyboard area of the mobile terminal; or, hiding the picture of the soft keyboard when a slide along a preset track is detected in a soft keyboard area of the mobile terminal, for example, the preset track may be set to downward, leftward, or rightward, and so on; or, hiding the picture of the soft keyboard when a click is detected in a preset area of the soft keyboard of the mobile terminal.

The soft keyboard display method provided in the embodiment may be applied to the mobile terminal such as a mobile phone, a tablet computer and so on. The soft keyboard display method provided in the embodiment may be adopted when a user edits a short message, searches a phone book or inputs text.

According to the embodiment, the picture of the soft keyboard is processed by adopting the $\alpha$ blending technology, so that the picture of the soft keyboard is semitransparent. The semitransparent picture of the soft keyboard is displayed on the mobile terminal touchscreen in a suspended manner, so that a display area of the mobile terminal touchscreen is increased, and due to the increase of the display area, the sizes of displayed items are increased accordingly. The user is able to find an item, which the user wants to find, with fewer input times, so that user experience is improved.

Figure 4:
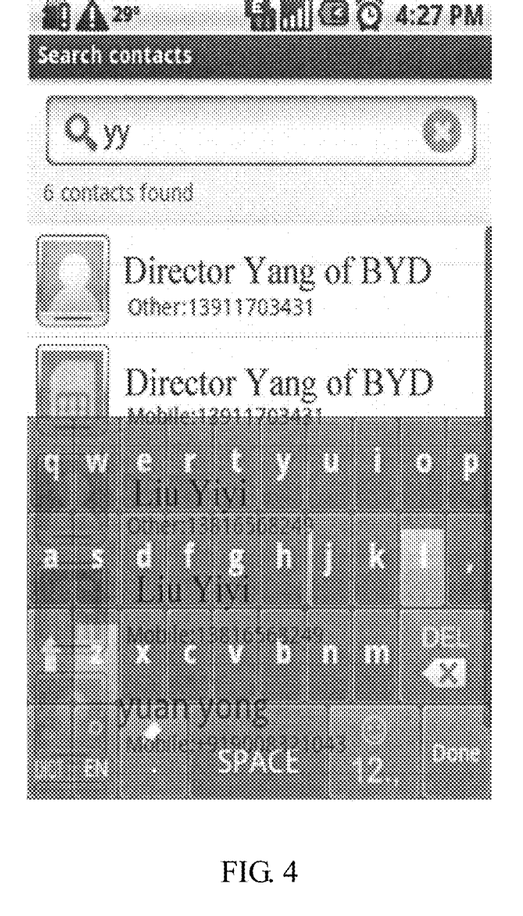
FIG. 4 is a schematic diagram of soft keyboard display according to an embodiment of the present invention.

For example, referring to FIG. 4, after the soft keyboard display method provided in the embodiment is adopted, the display area is increased, and the user only needs to input two characters to find the item that the user wants to find, "yuan yong," while three characters need to be input in the prior art.

Figure 5:
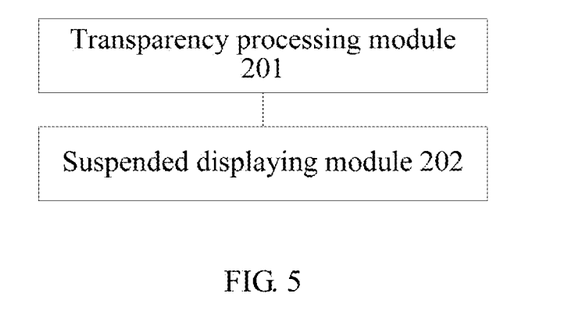
FIG. 5 is a schematic structural diagram of a mobile terminal according to another embodiment of the present invention.

Referring to FIG. 5, another embodiment of the present invention provides a mobile terminal, including: a transparency processing module 201 configured to process a picture of a soft keyboard by adopting an $\alpha$ blending technology according to a preset transparency parameter, so that the picture of the soft keyboard presents transparency corresponding to the transparency parameter; and a suspended displaying module 202 configured to display a processed picture of the soft keyboard on a current background picture of a mobile terminal touchscreen in a suspended manner when it is detected that the soft keyboard needs to be displayed.

The $\alpha$ blending technology is used to achieve an image overlay display function, and its principle is as follows:

First, tri-color values (in this embodiment, the tri-color values may be R, G and B) of each pixel of a source image (in this embodiment, the source image is the picture of the soft keyboard) and a target image (in this embodiment, the target image is the current background picture of the mobile terminal touchscreen) are separated.

Secondly, three color components of the pixel of the source image are each multiplied by a set transparency parameter (in this embodiment, the transparency parameter is set to $\alpha$, for example, 0.6).

Then, three color components of the pixel of the target image are each multiplied by a negated value of the transparency parameter (that is, $1-\alpha$, for example, $1-0.6=0.4$).

Finally, the processed color components of the pixel of the source image are each added to the processed corresponding color components of the pixel of the target image to obtain color components of a pixel of a composite image, so as to achieve an effect of displaying the source image on the target image in a suspended manner.

The transparency parameter ranges from 0 to 1, excluding 0 and 1. For example, the transparency parameter may be set to 0.6, 0.5, 0.3, and so on, a specific value of which is not limited in this embodiment.

Further, the mobile terminal includes at least one of the following modules: a first hiding module configured to hide the picture of the soft keyboard when a click or a slide is detected in a non-soft-keyboard area of the mobile terminal; a second hiding module configured to hide the picture of the soft keyboard when a slide along a preset track is detected in a soft keyboard area of the mobile terminal; and a third hiding module configured to hide the picture of the soft keyboard when a click is detected in a preset area of the soft keyboard of the mobile terminal.

According to the embodiment, the picture of the soft keyboard is processed by adopting the $\alpha$ blending technology, so that the picture of the soft keyboard is semitransparent. The semitransparent picture of the soft keyboard is displayed on the mobile terminal touchscreen in a suspended manner, so that a display area of the mobile terminal touchscreen is increased, and due to the increase of the display area, the sizes of displayed items are increased accordingly. A user is able to find an item, which the user wants to find, with fewer input times, so that user experience is improved.

Figure 6:
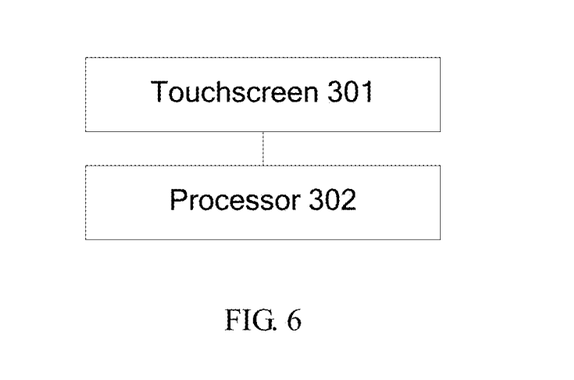
FIG. 6 is a schematic structural diagram of a mobile terminal according to another embodiment of the present invention.

Referring to FIG. 6, another embodiment of the present invention provides a mobile terminal, including: a touchscreen 301 and at least one processor 302, where the processor 302 is coupled with the touchscreen 301; the processor 302 is configured to process a picture of a soft keyboard by adopting an α blending technology according to a preset transparency parameter, so that the picture of the soft keyboard presents transparency corresponding to the transparency parameter and displays a processed picture of the soft keyboard on a current background picture of the touchscreen in a suspended manner when it is detected that the soft keyboard needs to be displayed.

The α blending technology is used to achieve an image overlay display function, and its principle is as follows:

First, tri-color values (in this embodiment, the tri-color values may be R, G and B) of each pixel of a source image (in this embodiment, the source image is the picture of the soft keyboard) and a target image (in this embodiment, the target image is the current background picture of the mobile terminal touchscreen) are separated.

Secondly, three color components of the pixel of the source image are each multiplied by a set transparency parameter (in this embodiment, the transparency parameter is set to α, for example, 0.6).

Then, three color components of the pixel of the target image are each multiplied by a negated value of the transparency parameter (that is, 1−α, for example, 1−0.6=0.4).

Finally, the processed color components of the pixel of the source image are each added to the processed corresponding color components of the pixel of the target image to obtain color components of a pixel of a composite image, so as to achieve an effect of displaying the source image on the target image in a suspended manner.

The transparency parameter ranges from 0 to 1, excluding 0 and 1. For example, the transparency parameter may be set to 0.6, 0.5, 0.3, and so on, a specific value of which is not limited in the embodiment.

Further, the processor 302 is configured to hide the picture of the soft keyboard when a click or a slide is detected in a non-soft-keyboard area of the touchscreen.

Further, the processor 302 is configured to hide the picture of the soft keyboard when a slide along a preset track is detected in a soft keyboard area of the touchscreen.

Further, the processor 302 is configured to hide the picture of the soft keyboard when a click is detected in a preset area of the soft keyboard of the touchscreen.

According to the embodiment, the picture of the soft keyboard is processed by adopting the α blending technology, so that the picture of the soft keyboard is semitransparent. The semitransparent picture of the soft keyboard is displayed on the mobile terminal touchscreen in a suspended manner, so that a display area of the mobile terminal touchscreen is increased and due to the increase of the display area, displayed items are increased accordingly. A user is able to find an item, which the user wants to find, with fewer input times, so that user experience is improved.

Persons of ordinary skill in the art may understand that all of or part of the steps of the foregoing embodiments may be implemented through hardware, or may be implemented by a program instructing relevant hardware. The program may be stored in a computer readable storage medium. The storage medium may be a read-only memory, a magnetic disk, or a compact disk and so on.

The foregoing descriptions are merely exemplary embodiments of the present invention, but are not intended to limit the present invention. Any modification, equivalent replacement, or improvement made without departing from the spirit and principle of the present invention shall fall within the protection scope of the present invention.

What is claimed is:

1. A soft keyboard display method comprising:
   processing a picture of a soft keyboard by adopting an Alpha Blending (α blending) technology according to a preset transparency parameter such that the picture of the soft keyboard's transparency corresponds to the preset transparency parameter;
   displaying the processed picture of the soft keyboard on a current background picture of a mobile terminal touchscreen in a suspended manner when it is detected that the soft keyboard needs to be displayed; and
   setting the preset transparency parameter to a value that differs from an alpha value used in the α blending technology.

2. The method according to claim 1, wherein after displaying the processed picture of the soft keyboard on the current background picture of the mobile terminal touchscreen in the suspended manner, the method further comprises hiding the processed picture of the soft keyboard when a click, a slide, or both are detected in a non-soft-keyboard area of the mobile terminal.

3. The method according to claim 1, wherein after displaying the processed picture of the soft keyboard on the current background picture of the mobile terminal touchscreen in the suspended manner, the method further comprises hiding the picture of the soft keyboard when a slide along a preset track is detected in a soft keyboard area of the mobile terminal.

4. The method according to claim 1, wherein after displaying the processed picture of the soft keyboard on the current background picture of the mobile terminal touchscreen in the suspended manner, the method further comprises hiding the picture of the soft keyboard when a click is detected in a preset area of the soft keyboard of the mobile terminal.

5. The method according to claim 1, wherein the value of the preset transparency parameter ranges from zero to one, excluding zero and one.

6. The method according to claim 1, further comprising adjusting the preset transparency parameter to a second value that differs from the alpha parameter used in the α blending technology.

7. A mobile terminal comprising:
   a touchscreen; and
   at least one processor,
   wherein the processor is coupled with the touchscreen,
   wherein the processor is configured to process a picture of a soft keyboard by adopting an α blending technology according to a preset transparency parameter such that the picture of the soft keyboard's transparency corresponds to the preset transparency parameter,
   wherein a processed picture of the soft keyboard is displayed on a current background picture of the touchscreen in a suspended manner when it is detected that the soft keyboard needs to be displayed, and
   wherein the preset transparency parameter is set to a value that differs from an alpha value used in the α blending technology.

8. The mobile terminal according to claim 7, wherein the processor is further configured to hide the picture of the soft keyboard when a click, a slide, or both are detected in a non-soft-keyboard area of the touchscreen.

9. The mobile terminal according to claim 7, wherein the processor is further configured to hide the picture of the soft keyboard when a slide along a preset track is detected in a soft keyboard area of the touchscreen.

10. The mobile terminal according to claim 7, wherein the processor is further configured to hide the picture of the soft keyboard when a click is detected in a preset area of the soft keyboard of the touchscreen.

11. The mobile terminal according to claim 7, wherein the value of the preset transparency parameter ranges from zero to one, excluding zero and one.

12. The mobile terminal according to claim 7, wherein the processor is further configured to adjust the preset transparency parameter to a second value that differs from the alpha parameter used in the α blending technology.

* * * * *

UNITED STATES PATENT AND TRADEMARK OFFICE
CERTIFICATE OF CORRECTION

| | |
|---|---|
| PATENT NO. | : 8,606,331 B2 |
| APPLICATION NO. | : 13/731339 |
| DATED | : December 10, 2013 |
| INVENTOR(S) | : Anzhao Yue |

It is certified that error appears in the above-identified patent and that said Letters Patent is hereby corrected as shown below:

Title Page, under (71) Applicant, should read:

Huawei Device Co., Ltd., Shenzhen (CN)

Signed and Sealed this
First Day of April, 2014

Michelle K. Lee
*Deputy Director of the United States Patent and Trademark Office*